United States Patent Office 3,526,440
Patented Sept. 1, 1970

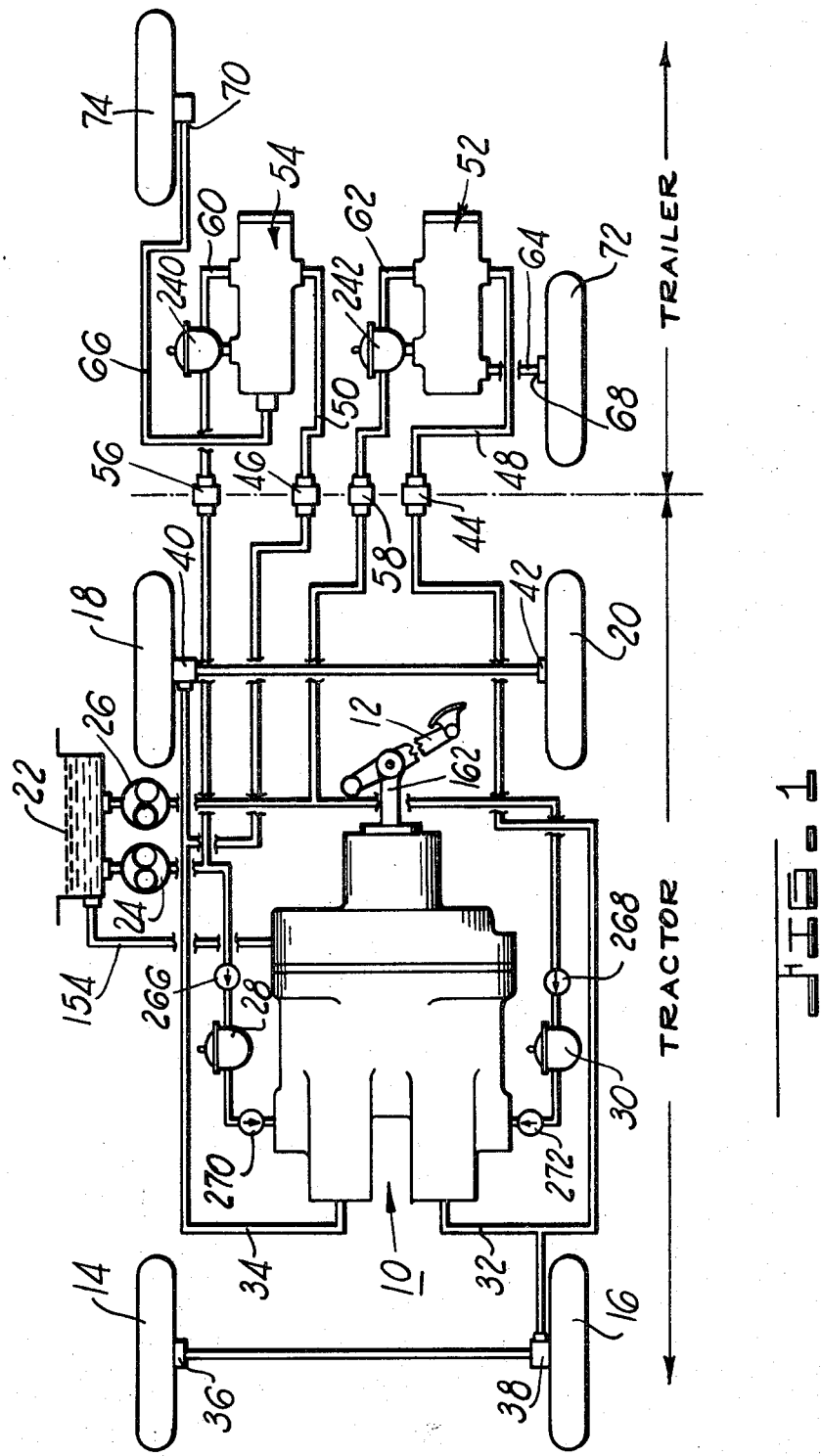

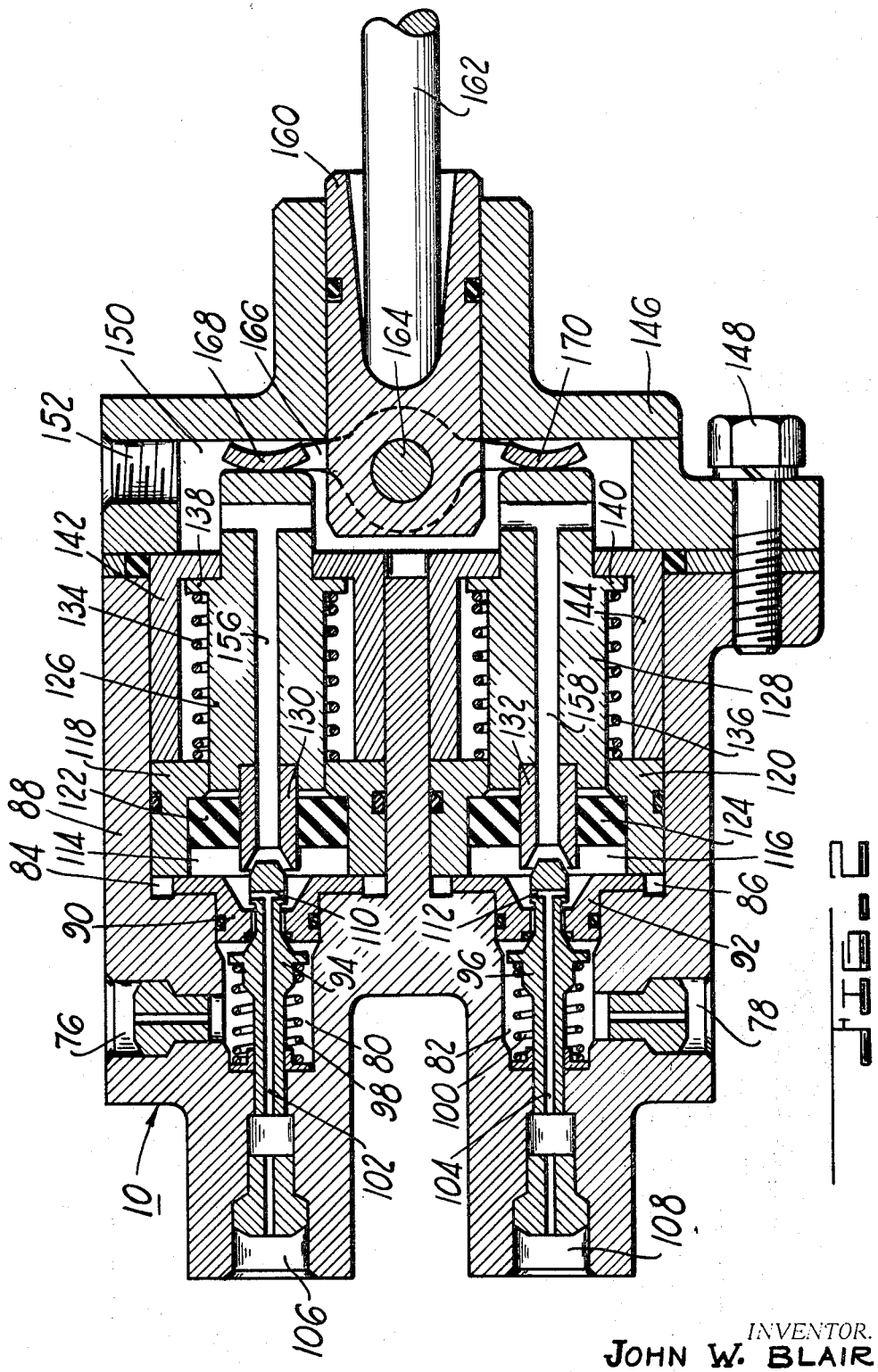

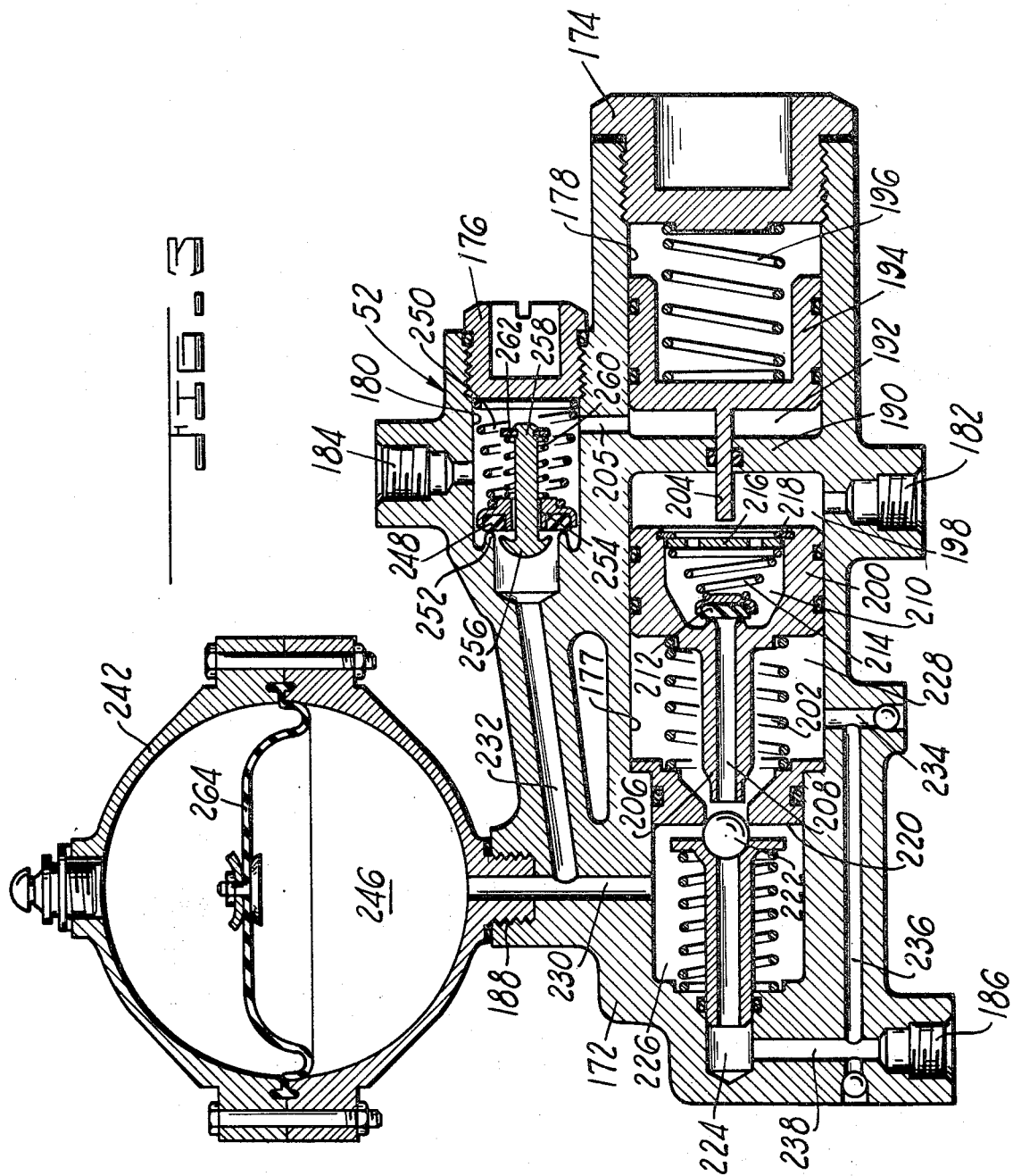

3,526,440
RELAY VALVE
John W. Blair, South Bend, Ind., assignor to The Bendix Corporation, a corporation of Delaware
Continuation of application Ser. No. 788,698, Dec. 27, 1968, which is a continuation of application Ser. No. 694,339, Dec. 28, 1967. This application June 2, 1969, Ser. No. 831,269
Int. Cl. B60t 7/12, 13/14
U.S. Cl. 303—40        10 Claims

ABSTRACT OF THE DISCLOSURE

A pressure operated relay valve for controlling fluid pressure delivered to the individual wheel brakes of a vehicle. An accumulator storage chamber is connected to the control chamber by a check valve in the relay valve. When the fluid pressure to the control chamber is raised, a piston contained therein will move causing the valve plunger to unseat the ball valve allowing pressure in the accumulator access to the control chamber. If the fluid pressure from the source upon brake application is below a predetermined value, a spring biased actuator mechanically allows the accumulator fluid pressure availability to the control chamber. From the control chamber the fluid pressure is directed to the wheel brakes to stop the vehicle.

---

This application is a continuation of U.S. application Ser. No. 788,698, filed Dec. 27, 1968, now abandoned, which was a continuation of U.S. application Ser. No. 694,339, filed Dec. 28, 1967, now abandoned.

SUMMARY

As vehicle manufacturers begin to consider full power hydraulic braking systems for tractor-trailer type vehicles to insure higher run-out pressures, lower pedal travel requirements, faster braking response times and standardization of braking components, consideration must be given on mating the full power hydraulic brake system for the tractor to the system of the trailer. Some consideration has been given to utilizing the more standard trailer brake components in the present state of the art which evolve around a system utilizing air pressure. However, it is the intent of this invention to provide a relay valve for the trailer which will permit the utilization of the full power hydraulic brake system of the tractor to operate a similar powered hydraulic brake system in the trailer whereby the advantages of the system in the tractor can be applied to the trailer as well.

It is an additional object of this invention to provide such a relay valve that also incorporates safety means to automatically apply the trailer brakes in the event of the reduction of hydraulic pressure in the tractor braking system.

DRAWING DESCRIPTION

FIG. 1 is a schematic illustration of a tractor-trailer type vehicle with a low power hydraulic brake system incorporated therein utilizing a relay valve for the trailer portion of the vehicle in accordance with the principles of this invention;

FIG. 2 is a cross sectional view of a full power hydraulic control valve for the tractor portion of the system of FIG. 1;

FIG. 3 is a cross sectional view of a relay valve for the trailer portion of the brake system of FIG. 1.

DETAILED DESCRIPTION

With reference now to FIG. 1 there is shown a split system hydraulic brake valve 10 adapted to be actuated by a brake pedal 12 within the cab of a truck for controlling the development of braking pressures to brake mechanisms (not shown) in the front wheels 14 and 16 and the rear wheels 18 and 20.

The valve 10 is shown to be connected in a hydraulic system which incorporates a hydraulic reservoir 22 connected to pumps 24 and 26 for developing separate pressures for the accumulators 28 and 30, respectively. The accumulators store the hydraulic pressure for the valve 10 until it is to be delivered, as by the operator depressing the brake pedal 12 to schedule the flow of hydraulic fluid into conduits 32 and 34 leading to the wheel cylinder inlets 36, 38 and 40, 42 of the front and rear wheels respectively.

Conduits 32 and 34 are also communicated to quick disconnect couplings 44 and 46 which connect them to conduits 48 and 50 leading to relay valves 52 and 54 of the trailer portion of the vehicle. In addition, the supply of pressure from the pumps 24 and 26 to the accumulators 28 and 30 and, respectively, directed to quick disconnect couplings 56 and 58 connecting the accumulator pressure in the tractor portion of the vehicle to conduits 60 and 62, respectively, of the trailer portion of the vehicle which are also connected to relay valves 54 and 52.

Completing the system description of FIG. 1, the relay valves 52 and 54 are connected by means of conduits 64 and 66 to wheel cylinder inlets 68 and 70 of braking mechanisms (not shown) in the wheels 72 and 74 of the trailer portion of the vehicle.

With regard now to FIG. 2, it will be observed that the accumulator pressure is directed to separate inlets 76 and 78 from the respective accumulators 28 and 30 of FIG. 1 to enter separate valve chambers 80 and 82 of the control valve 10. These valve chambers are provided at the end of bores 84 and 86 within the housing 88 of the control valve 10. Valve chambers 80 and 82 are sealed from the bores 84 and 86 by means of valve seats 90 and 92 and valve poppets 94 and 96 urged against the seats by valve springs 98 and 100.

The valve poppets 94 and 96 are each axially drilled to have passages 102 and 104 communicated with outlet ports 106 and 108 of the control valve 10, at one end, and transversely drilled, as at 110 and 112, respectively, to open into respective control chambers 114 and 116. The control chambers 114 and 116 are created in the bores 84 and 86 by collars 118 and 120, disc reaction members 122 and 124 within the collars 118 and 120 and the actuating plungers 126 and 128 having valve sleeves 130 and 132 slidably projecting therefrom through the disc 122 and 124 to operate the valve poppets 94 and 96, respectively. Valve return springs 134 and 136 are assembled between the collars 118 and 120 and radial flanges 138 and 140 of the actuating plungers 126 and 128, respectively.

This assembly is then locked within the bores 84 and 86 by means of rings 142 and 144 held by the end structure 146 that is bolted to valve housing 88 as by a plurality of bolts 148 to close the bores 84 and 86 and while so doing provide a return chamber 150 for the return port 152, which when viewing FIG. 1 again is connected by conduit 154 to the reservoir 22. Passageways 156 and 158 through the actuating plungers 126 and 128 and the valve sleeves 130 and 132 communicate the return chamber 150 to the respective control chambers 114 and 116 when the control valve 10 is in the attitude shown.

Completing the description of the control valve 10, the end cap 146 is provided with an actuating element 160 that is adapted to be connected to a push rod 162 leading from the brake pedal 12 (see FIG. 1.), which actuating element is connected by means of a pin 164 to a walking beam 166 having peripheral surfaces of revolution 168 and 170 adapted, upon joining of the end cap 146 to the housing 88, as by the bolts 148, to abut on the ends of the actuating plungers 126 and 128 on a line surface at or about the axis of the plungers 126 and 128.

With regard now to the construction of the relay valve, relay valve 52 being shown by FIG. 3, it should be noted that both the relay valves 52 and 54, schematically illustrated in FIG. 1, are identical. Therefore, the description of the relay valve 52 in FIG. 3 will apply to both of the valves. This valve is shown to be constructed from a housing 172, which is shown for purposes of illustration in this patent to be a single member, preferably cast, having cored bores closed by plugs 174 and 176. As will readily be apparent to those skilled in the art to which this invention relates, the housing 172 in its actual design would preferably be of two parts in order to facilitate assembly of the internal details. As mentioned above, bores 177, 178 and 180 are formed in the housing 172, the housing 172 further has inlet ports 182 and 184, a discharge port 186 and an accumulator port 188.

Between the bores 177 and 178, a partition 190 is provided. A variable volume chamber 192 is thus created by a piston 194 operatively biased by a spring 196 from the plug 174 in bore 178, and a variable volume control chamber 198 is created by a piston 200 that is biased by a spring 202 in bore 177. The springs 196 and 202 respectively bias the pistons 194 and 200 toward the partition 190. Piston 194 has provided therewith a projection 204 which sealingly extends through the partition 190 to within the chamber 198 whenever the pressure in the chamber 192 falls below a certain value to operate the piston 200, as will be explained in greater detail hereinafter. It should be noted that inlet 184 communicates via the bore 180 to a passage 205 in the housing 172 opened to the chamber 192; whereas the inlet 182 for the bore 177 communicates directly to the variable volume control chamber 198. With reference now to FIG. 1, it should be observed that conduits 60 and 62 are respectively connected to inlets 184 of the relay valves; whereas conduits 48 and 50 are respectively connected to the inlets 182 of the relay valves.

The piston 200 is formed with a valve plunger 206 projecting forwardly thereof which is provided with a passage 208 leading to a hollowed opening 210 of the piston 200 facing the variable volume control chamber 198. Within the hollowed opening 210 of the piston 200 a valve 212 biased by a spring 214 operatively connected to the valve 212 and positioned by a plate 216 held within the hollowed opening 210 by a snap ring 218 closes the communication of the passage 208 to the hollowed opening 210. The plate 216, as will be noted with regard to FIG. 3, is provided with a plurality of openings to communicate the chamber 198 to the hollowed portion 210.

Ahead of the piston 200 a valve seat 220 is affixed to the housing with a spring biased valve assembly sealingly and slidably mounted in the end 224 of the bore 177 to create a valve chamber 226 ahead of the valve seat 220 and a control chamber 228 between the valve seat and the piston 200. Passage means 230 communicates the accumualtor port 188 to the valve chamber 226 and a passage 232 communicates the bore 180 to the passage 230. Another passage means 234 leads from the variable volume control chamber 228 to a passage 236 that communicates with passage 238 connecting the end 224 of the bore 177 with the discharge port 186. In FIG. 1 there is shown accumulator means 240 and 242 connected to the relay valves 52 and 54. It can be seen now, with respect to FIG. 3, that these accumulators, in the form of accumulator 242, are threadedly related to the port 188 to receive the pressure being communicated from passage 232 to the passage 230 leading into the valve chamber 226 and the accumulator storage chamber 246.

Within the bore 180 a valve means is employed having an annular valve seat 248 urged by a spring 250 extending between the seat 248 and plug 176 to abut a fixed seat 252 of the housing 172 thereby limiting the communication of fluid pressure from the inlet 184 via the bore 180 to the passage 232 to that which passes through the central opening 254 of the annular valve 248. A valve poppet 256 having a valve stem 258 is assembled to the annular valve by means of a spring 260 and a spring retainer plate 262 snap fitted to the stem 258 so that the opening 254, until the pressure in the chamber 246 acting upon the bladder 264 is sufficient on the poppet 256 to close the opening 254; i.e., when the pressure on the poppet 256 from the passage 232 is equal to that in the inlet 184 the spring 260 will close the poppet 256 onto the valve 288 to seal the passage 254 thus preventing further fluid communication to the accumulator 242.

Before passing onto the operation of the brake system, it should be noted that the relay valve shown in FIG. 3 has been drawn to have its structural elements in a position where hydraulic pressure exists therewithin but is not yet sufficient in the inlet 184 to bring about the closure of the valve 256 even though it is of sufficient magnitude to bias spring 196 so that piston 194 and its projection 204 are not operating the piston 200.

OPERATION

During normal operation the driver of the tractor upon desiring to brake the vehicle will plase his foot on the brake pedal 12 to push it inwardly and thereby move the push rod 162 into the control valve housing 10 causing the actuating element 160 to carry the walking beam 166 forwardly. This will, in turn, equally move the actuating plungers 126 and 128 to lap the valve sleeves 130 and 132 onto the valve poppets 94 and 96. This closes off the return passages 156 and 158 from the outlet 106 and 108 via the passages 102 and 104 of the plungers 94 and 96.

Further depression of the brake pedal will force the valve poppets 94 and 96 away from the esats 90 and 92 whereby the hydraulic pressure in the valve chambers 80 and 82 is directed through the valve seats 90 and 92 into control chambers 114 and 116. From these ccontrol chambers the hydraulic pressure will pass into passages 110 and 112 into passages 102 and 104 and thus be delivered to the outlet ports 106 and 108.

At the same time the control pressure in the chambers 114 and 116 will react upon the disc 122 and 124 to extrude them onto the forward faces of the plungers 126 and 128 to provide the operator with a "feel" of the valve operation.

As can be surmised from FIG. 1, the pressure being delivered via the outlets 106 and 108 enter the conduits 34 and 32 to actuate the braking mechanisms for the respective wheels. The pressure also is directed to the respective couplers 46 and 44 to enter the valves 54 and 52 at inlet 182 to pressurize the chamber 198. This causes the piston 200 to move to the left in FIG. 3 to abut the projection 206 therefrom onto the ball 222 whereby the valve mechanism of the relay valves 54 and 52 are lapped. Upon increasing the line pressure to the tractor wheel brakes the pressure in the chamber 198 will rise to unseat the ball 222 from the seat 220 whereby the accumulator pressure from the chamber 246 will flow into the control chamber 228 of the relay valves to the passages 234, 236 and 238 wherefrom it is directed to the outlet 186 leading to the trailer brakes for the wheels 74 or 72, which should be understood by those skilled in the art to be separate axles of the trailer system. Thus, the trailer brakes are applied under normal conditions with the pressure utilized for applying the tractor brakes.

In the event of a malfunction in the pressure supply system as by a failure in one or the other or both of the pumps 24 and 26 or a line failure in one or the other or both of the hydraulic systems, check valves 266 and 268, in addition to check valves 270 and 272, will insure a limited number of applications beyond the failure of the brake control valve 10 and thus similar operations of the relay valves 54 and 52. It should also be noted that in the event of a decrease in pressure in the accumulator chamber 246 for the relay valves 52 and 54 that the chamber 192 will be depressurized whereby the spring 196 will move the piston 194 to the left to contact the plate 216 and thus urge the piston 200 to unseat the ball 222 and automatically apply the trailer brakes for the respective axles containing wheels 72 and 74. In this regard it should be noted that the spring 250 is designed to have sufficient force to seat the valve 248 on the seat 252 whenever the pressure in the accumulator chamber 246 is below a certain value. In that the valve 256 is normally urged by spring 260 to seat also on the valve 248 whenever the accumulator chamber 246 is pressurized, this will mean that the stored pressure in the accumulator 246 will not be allowed to flow backwards to the tractor hydraulic system; whereas the chamber 192 will be exhausted by return flow through the passage 205 into the bore 180 and out the inlet 184 to the point of failure in the system. Therefore, the trailer braking is automatic upon any failure in the hydraulic brake system causing a depletion of fluid therefrom. It is believed that the fluid flow path during a release of the brake after an application is readily obvious to those from reading the operation. However, it should be noted that as for the relay valves 52 and 54 that when the pressure is released from the chambers 198 as by returning the plungers 126 and 128 to the position shown in FIG. 2 for the control valve 10 that the pressure in the control chamber 228 in addition to the spring force of the spring 202 will return the piston whereby the ball 222 is again seated on the seat 220. This pressure in the chamber 228 will then flow into the passage 208 and unseat the valve 212 whereby it will then flow through the drilled openings in the plate 216 and out the inlet 182 back to the tractor hydraulic brake system. The valve 212 will, because of the spring 214, maintain a residual pressure, as desired, in the trailer brake mechanisms.

I claim:

1. A relay valve connected to a fluid pressure source comprising:
    a housing having a fluid pressure source inlet, a control pressure inlet and a discharge port;
    valve means within said housing between said source inlet and said discharge port;
    said valve means comprising a pressure responsive valve actuating means and a valve;
    said valve actuating means including a check valve located within a passage means through said valve actuating means;
    said valve actuating means having an applied and a released position;
    said valve actuating means responsive to said control pressure to assume its applied attitude, wherein said valve actuating means abuts said valve to thereby open said valve which allows communication of said fluid pressure source to said discharge port;
    said check valve being isolated from said fluid pressure source when said valve actuating means is in said applied attitude;
    said check valve operative to permit fluid communication from said discharge port to said control pressure inlet via said passage means when said valve actuating means is in said released attitude; and
    a spring biased actuator for mechanical operation of said valve actuating means whenever said fluid pressure source falls below said predetermined value.

2. A hydraulic relay valve for a brake system which is adapted to be actuated by fluid pressure and mechanically, said relay valve comprising:
    a housing having a first and a second inlet port and a discharge port and a bore therein with passage means communicating said first inlet port to said bore, said bore to said discharge port, and said second inlet port to said bore;
    accumulator means in communication with a first portion of said passage means communicating said first inlet port to said bore;
    check valve means in said first portion of said passage means for maintaining a predetermined hydraulic pressure in said accumulator means;
    a valve seat affixed to said housing in said bore between the inlet of said first portion of said passage means thereinto and an exit of a second portion of said passage means communicating said bore to said discharge port;
    valve poppet means slidably carried by said housing and biased to engage said valve seat to create a valve chamber between said seat and the end of said bore;
    valve actuating means slidable in said bore of said housing on the opposite side of said valve seat than said poppet means, which actuating means creates a variable volume chamber between it and said valve seat, said valve actuating means having an opening therethrough communicating said variable volume chamber to the portion of the bore therebehind into which said second inlet port is communicated which opening is closed by engagement of said valve actuating means with said valve poppet means as said valve actuating means passes through said valve seat thereonto, said valve actuating means being normally biased away from said valve seat;
    residual valve means in said valve actuating means adapted to limit flow through said opening only in the direction from said variable volume chamber;
    means affixed to said housing separating said bore behind said actuating means into first and second portions, said first portion being open to said second inlet port and said second portion of which is open to said first inlet port; and
    a piston in said second portion of said bore which is biased by a spring to operatively connect with said valve actuating means via a projection sealingly supported by said means to extend into said first portion of said bore, said piston being arranged to be moved by hydraulic pressure of said first inlet port in opposition to said spring whereby said projection is removed from said valve actuating means when hydraulic pressure at said first inlet is above a predetermined value.

3. The structure of claim 2 wherein said check valve means is further characterized as an annular valve element and a concentric valve element connected by spring means with the annular valve element being connected to said housing.

4. A relay valve comprising:
    a housing with a bore therein;
    means dividing said bore into two chambers, said means having an opening therethrough communicating said chambers with one another, a valve seat formed in said opening; a passageway in communication with one of said chambers and with a first inlet port;
    a pressure source in communication with said passageway downstream of said first inlet port;
    two-way valve means in said passageway normally closing communication between said first inlet and said pressure source and said one of said chambers and responsive to predetermined pressures at said first inlet and said pressure source to open said two-way valve means to permit flow in the direction of the lower pressure acting across said two-way valve means;
    a valve member in said one chamber resiliently urged against said seat formed in said opening;
    actuating means in said other chamber dividing said other chamber into opposed chambers, one of said opposed chambers communicating with said one chamber via said opening and with an outlet port, the other of said opposed chambers communicating with a control pressure port, said actuating means having a portion engageable with said valve member to unseat said valve member in response to control port pressure to thereby establish communication between said inlet port and said outlet port, said actuating means further including check valve means permitting flow only from said outlet port to said control port at such time as when said actuating means portion is disengaged from said valve member.

5. The structure of claim 4 wherein said valve member and said actuating means including said check valve means are arranged to permit fluid flow into and out of said relay valve to self purge said relay valve of air.

6. A relay valve, as recited in claim 4, wherein said actuating means comprises:
a piston means having an axially protruding portion for engagement with said valve member;
said piston means having on one end a bore and on its other end said axially protruding portion including a passage means therethrough which communicates with said bore;
a retainer means suitably installed in said bore of said piston means; and
resilient means abutting said retainer to normally urge said check valve means against said passage means.

7. Actuating means, as recited in claim 6, wherein said retainer means includes a disc-like plate and snap ring, said disc-like plate having a plurality of openings to allow communication of said bore of said piston means with said control pressure port.

8. A relay valve connected to a fluid pressure source comprising:
a housing having therein a bore with closed ends;
a valve seat means disposed in said bore and forming a first chamber between said valve seat means and one end of said bore;
said first chamber having a first inlet port in communication with a source of pressurized fluid;
a valve member in said first chamber resiliently urged against said valve seat means;
an actuating means disposed in said bore and forming second and third chambers between said actuating means and said valve seat means and the other end of said bore, respectively;
said actuating means engageable with said valve member for urging it off of said valve seat means, said actuating means normally resiliently urged away from said valve member;
said second chamber having a discharge port;
said third chamber having a second inlet port in communication with a source of pressurizeable fluid;
said actuating means including a passage means for communicating between said second and third chambers;
check valve means carried by said actuating means and operatively cooperating with said passage means to control communication therethrough with said third chamber;
said check valve means operable upon pressurization of said source of pressurizeable fluid to isolate said second chamber therefrom;
said actuating means responsive to pressurization of said source of pressurizeable fluid to unseat said valve member from said valve seat means and thereby allow communication between said source of pressurized fluid and said discharge port;
said check valve means operative at a predetermined lower pressure limit of said source of pressurizeable fluid to establish communication between said second and third chambers; and
means to automatically move said actuating means into engagement with said valve seat means, when the fluid pressure from said source is below a predetermined value, permitting stored fluid under pressure to communicate with said second chamber.

9. A relay valve, as recited in claim 8, and further including a two-way valve means operatively connected in series flow relationship between said source of pressurized fluid and said accumulator.

10. A relay valve, as recited in claim 8, wherein said stored fluid is retained in an accumulator connecting in series flow relationship between said source of pressurized fluid and said first chamber.

References Cited
UNITED STATES PATENTS

| | | |
|---|---|---|
| 2,688,335 | 9/1954 | Gunderson. |
| 2,752,947 | 7/1956 | Hruska. |
| 2,897,012 | 7/1959 | Vorech. |
| 3,059,975 | 10/1962 | Morse. |
| 3,071,147 | 1/1963 | Dudzinski. |

MILTON BUCHLER, Primary Examiner

J. J. McLAUGHLIN, JR., Assistant Examiner

U.S. Cl. X.R.

137—116.5, 596.2; 303—2, 7, 52, 54